United States Patent
Sandler et al.

(10) Patent No.: US 11,676,008 B2
(45) Date of Patent: Jun. 13, 2023

(54) PARAMETER-EFFICIENT MULTI-TASK AND TRANSFER LEARNING

(71) Applicant: Google LLC, Mountain View, CA (US)

(72) Inventors: Mark Sandler, Mountain View, CA (US); Andrey Zhmoginov, Mountain View, CA (US); Andrew Gerald Howard, Culver City, CA (US); Pramod Kaushik Mudrakarta, Chicago, IL (US)

(73) Assignee: GOOGLE LLC, Mountain View, CA (US)

(*) Notice: Subject to any disclaimer, the term of this patent is extended or adjusted under 35 U.S.C. 154(b) by 892 days.

(21) Appl. No.: 16/577,698

(22) Filed: Sep. 20, 2019

(65) Prior Publication Data
US 2020/0104706 A1    Apr. 2, 2020

Related U.S. Application Data

(60) Provisional application No. 62/737,763, filed on Sep. 27, 2018.

(51) Int. Cl.
*G10L 15/16* (2006.01)
*G06N 3/08* (2023.01)
*G06N 3/045* (2023.01)

(52) U.S. Cl.
CPC ............ *G06N 3/08* (2013.01); *G06N 3/045* (2023.01); *G10L 15/16* (2013.01)

(58) Field of Classification Search
CPC .................................. G10L 15/16; G06N 3/08
See application file for complete search history.

(56) References Cited

U.S. PATENT DOCUMENTS

| | | | |
|---|---|---|---|
| 2014/0257803 A1* | 9/2014 | Yu ................. | G06N 3/084 704/232 |
| 2017/0024643 A1* | 1/2017 | Lillicrap ........... | G06N 3/084 |
| 2017/0228633 A1* | 8/2017 | Danihelka .......... | G06N 3/044 |

(Continued)

OTHER PUBLICATIONS

Cai, et al., "Enhancing CNN Incremental Learning Capability with an Expanded Network," IEEE International Conference on Multimedia and Expo (ICME), 2018. (Year: 2018).*

(Continued)

*Primary Examiner* — Feng-Tzer Tzeng
(74) *Attorney, Agent, or Firm* — Dority & Manning, P.A.

(57) ABSTRACT

The present disclosure provides systems and methods that enable parameter-efficient transfer learning, multi-task learning, and/or other forms of model re-purposing such as model personalization or domain adaptation. In particular, as one example, a computing system can obtain a machine-learned model that has been previously trained on a first training dataset to perform a first task. The machine-learned model can include a first set of learnable parameters. The computing system can modify the machine-learned model to include a model patch, where the model patch includes a second set of learnable parameters. The computing system can train the machine-learned model on a second training dataset to perform a second task that is different from the first task, which may include learning new values for the second set of learnable parameters included in the model patch while keeping at least some (e.g., all) of the first set of parameters fixed.

26 Claims, 5 Drawing Sheets

(56) References Cited

U.S. PATENT DOCUMENTS

2017/0330586 A1* 11/2017 Roblek .................. G10L 25/30
2021/0201116 A1* 7/2021 Rabinowitz ............. G06N 3/08

OTHER PUBLICATIONS

Hu, et al., "Squeeze-and-Excitation Networks," IEEE Transactions on Pattern Analysis and Machine Intelligence, Sep. 2017. (Year: 2017).*

Abadi et al., "TensorFlow: Large-Scale Machine Learning on Heterogeneous Systems", www.tensorflow.org.

Chen et al., "Federated Meta-Learning for Recommendation", arXiv:1802.07876v1, Feb. 22, 2018, 9 pages.

Chollet, "Xception: Deep Learning with Depthwise Separable Convolutions", Computer Society Conference on Computer Vision and Pattern Recognition, Jul. 2017, pp. 1251-1258.

Cui et al., "Large Sale Fine-Grained Categorization and Domain-Specific Transfer Learning", arXiv:1806,06193v1, Jun. 16, 2018, 10 pages.

Deng et al., "ImageNet: A Large-Scale Hierarchical Image Database", Computer Society Conference on Computer Vision and Pattern Recognition, Miami Beach, Florida, Jun. 20-25, 2009, 8 pages.

Donahue et al., "DeCAF: A Deep Convolutional Activation Feature for Generic Visual Recognition", ArXiv:1310,1531v1, Oct. 6, 2013, 10 pages.

Finn et al., "Model-Agnostic Meta-Learning for Fast Adaptation of Deep Networks". arXiv preprint arXiv:1703.03400, 2017, 12 pages.

Hoffer et al., "Fix Your Classifier: The Marginal Value of Training the Last Weight Layer", Computing Research Repository, http://arxiv.org/abs/1801.04540, 11 pages.

Howard et al, "Mobilenets: Efficient Convolutional Neural Networks for Mobile Vision Applications", Computer Research Repository, 2017, http://arxiv.org/abs/1704.04861, 9 pages.

Ioffe et al., "Batch Normalization: Accelerating Deep Network Training by Reducing Internal Covariate Shift", Proceedings of the 32nd International Conference on International Conference on Machine Learning—vol. 37, JMLR.org, Jul. 2015, pp. 448-456.

Kim et al., "Deep Network with Support Vector Machines", In Minho Lee, Akira Hirose, Zeng-Guang Hou, and Rhee Man Kil (eds.), Neural Information Processing, Berlin, Heidelberg, 2013. Springer Berlin Heidelberg, pp. 458-465.

Konečný et al., "Federated Learning: Strategies for Improving Communication Efficiency", Conference on Neural Information Processing Systems, Workshop on Private Multi-Party Machine Learning, 2016, https://arxiv. org/abs/1610.05492, 5 pages.

Krause et al., "3d Object Representations for Fine-Grained Categorization", In Proceedings of the IEEE International Conference on Computer Vision Workshops, 2013, 8 pages.

Krishnamoorthi, "Quantizing Deep Convolutional Networks for Efficient Inference: A Whitepaper", https://www.arxiv.org/1806.08342v1, Jun. 2018, 36 pages.

Krizhevsky. "Learning Multiple Layers of Features from Tiny Images", Technical Report, University of Toronto, 2009, 60 pages.

Krizhevsky et al., "Imagenet Classification With Deep Convolutional Neural Networks", Advances in Neural Information Processing Systems 25: 26th Annual Conference on Neural Information Processing Systems 2012, Dec. 3-6, 2012, Lake Tahoe, Nevada, United States, http://papers.nips.cc/paper/4824-imagenet-classification-with-deep-convolutional-neural-networks, 9 pages.

Li et al., "Revisiting Batch Normalization for Practical Domain Adaptation", Computer Research Repository, http://arxiv.org/abs/1603.04779, 12 pages.

Liu et al., "SSD: Single Shot Multibox Detector", European conference on computer vision, Springer, 2016, 17 pages.

Ma et al., "Shufflenet V2: Practical Guidelines for Efficient CNN Architecture Design", arXiv:1807.11164, 2018, 19 pages.

Maji et al., "Fine-Grained Visual Classification of Aircraft", arXiv:1306.5151, 2013, 6 pages.

Montufar et al., "On the Number of Linear Regions of Deep Neural Networks", Z. Ghahramani, M. Welling, C. Cortes, N. D. Lawrence, and K. Q. Weinberger (eds.), Advances in Neural Information Processing Systems 27, Curran Associates, Inc., 2014, http://papers.nips.cc/paper/5422-on-the-number-of-linear-regions-of-deep-neural-networks.pdf., pp. 2924-2932.

Nichol et al., "Reptile: A Scalable Metalearning Algorithm", arXiv:1803.02999v1, 2018, 11 pages.

Rosenfeld et al., "Intriguing Properties of Randomly Weighted Networks: Generalizing While Learning Next to Nothing", Computer Research Repository, 2018, http://arxiv.org/abs/1802.00844. 12 pages.

Sandler et al., "Inverted Residuals and Linear Bottlenecks: Mobile Networks for Classification, Detection and Segmentation", arXiv:1801.04381, 2018, 14 pages.

Razavian et al., CNN Features Off-the-Shelf: An Astounding Baseline for Recognition. In Proceedings of the IEEE Conference on Computer Vision and Pattern Recogmtion Workshops, 2014, pp. 806-813.

Simonyan et al, "Very Deep Convolutional Networks for Large-Scale Image Recognition", Computer Research Repository, 2014, http://arxiv.org/abs/1409.1556, 13 pages.

Streeter, "Approximation Algorithms for Cascading Prediction Models", Proceedings of the 35th International Conference on Machine Learning, 2018, 9 pages.

Szegedy et al., "Rethinking the Inception Architecture for Computer Vision", Proceedings of the IEEE Conference on Computer Vision and Pattern Recognition, 2016, pp. 2818-2826.

Yosinski et al., "How Transferable are Features in Deep Neural Networks?", In Proceedings of the 27th International Conference on Neural Information Processing Systems—vol. 2,2014, Cambridge, MA, USA, MIT Press, 9 pages.

Zhang et al., "Shufflenet: An Extremely efficient Convolutional Neural Network for Mobile Devices", Computer Research Repository, 2017, http://arxiv.org/abs/1707.01083, 9 pages.

Zhou et al., "Places: A 10 million Image Database for Scene Recognition", IEEE transactions on Pattern Analysis and Machine Intelligence, 2017.

Cai et al, "Enhancing CNN Incremental Learning Capability with an Expanded Network", 2018, 6 pages.

Extended European Search Report for EP 19200085.9, dated Apr. 3, 2020, 7 pages.

Rosenfeld et al, "Incremental Learning Through Deep Adaptation", arXiv:1705v2, Feb. 13, 2018, 13 pages.

* cited by examiner

PARAMETER-EFFICIENT MULTI-TASK AND TRANSFER LEARNING

FIELD

The present disclosure relates generally to machine learning. More particularly, the present disclosure relates to systems and methods to perform parameter-efficient multi-task learning, transfer learning, and/or model personalization via the use of model patches.

BACKGROUND

Various forms of machine-learned models have revolutionized many areas of machine intelligence. For example, deep neural networks are now used for many vision tasks that even few years ago were considered nearly impenetrable. As the space of possible tasks expands and starts to personalize, there is a growing need for an ability to quickly build and customize different iterations of machine-learned models.

Furthermore, as networks and hardware become better and faster, much of the computation is being shifted to an "on device" paradigm in which the machine-learned models are stored and implemented locally on embedded devices, user devices, edge devices, or other forms of "resource-constrained" devices, thereby delivering faster response time and better security and privacy guarantees.

However, the move towards increased amounts of on device computation in resource-constrained environments provides challenges. In particular, although there has been recent progress in reducing model sizes (e.g., as represented by number of parameters) without sacrificing model accuracy, delivering, maintaining, and updating hundreds of models on the local device is still a significant expense in terms of bandwidth, energy, and storage costs. In particular, holding and updating multiple models (e.g., neural networks) on the device is computationally or resource expensive in the sense that the handling of such multiple networks introduces redundant over-the-air costs (e.g., bandwidth or network usage for transmitting models), update and maintenance cost (e.g., costs to re-train or personalize each different model), memory usage (e.g., storage space for each different model), and the like.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by one or more computing devices, a machine-learned model that has been previously trained on a first training dataset to perform a first task. The machine-learned model can include a first set of learnable parameters. The method can include modifying, by the one or more computing devices, the machine-learned model to include a model patch. The model patch can include a second set of learnable parameters. The method can include, after modifying the machine-learned model to include the model patch, training, by the one or more computing devices, the machine-learned model on a second training dataset to perform a second task that is different from the first task. Training, by the one or more computing devices, the machine-learned model on the second training dataset to perform the second task can include learning new values for the second set of learnable parameters included in the model patch.

In some implementations, training, by the one or more computing devices, the machine-learned model on the second training dataset to perform the second task can include learning the new values for the second set of learnable parameters while keeping at least some the first set of learnable parameters fixed.

In some implementations, training, by the one or more computing devices, the machine-learned model on the second training dataset to perform the second task can include learning the new values for the second set of learnable parameters while keeping at least a majority of the first set of learnable parameters fixed.

In some implementations, training, by the one or more computing devices, the machine-learned model on the second training dataset to perform the second task can include learning the new values for the second set of learnable parameters while keeping all of the first set of learnable parameters fixed.

In some implementations, after modification of the machine-learned model to include the model patch, at least a portion of the model patch can be positioned structurally prior to a final layer of the machine-learned model.

In some implementations, after modification of the machine-learned model to include the model patch, at least a portion of the model patch can be included in an intermediate layer of the machine-learned model.

In some implementations, the model patch can further include the final layer of the machine-learned model.

In some implementations, the machine-learned model can include a plurality of layers and at least some the second set of learnable parameters included in the model patch can include one or both of scale and bias parameters for one or more layers of the plurality of layers.

In some implementations, the scale and bias parameters for the one or more layers can include scale and bias parameters for one or more batch normalization operations performed respectively for the one or more layers.

In some implementations, the scale and bias parameters for the one or more layers can include scale and bias parameters for one or more layer normalization operations, one or more batch renormalization operations, or one or more group normalization operations performed respectively for the one or more layers.

In some implementations, the machine-learned model can include a convolutional machine-learned model that includes one or more convolutional filters and modifying, by the one or more computing devices, the machine-learned model to include the model patch can include replacing, by the one or more computing devices, at least one of the convolutional filters with a reduced-parameter version of the convolutional filter.

In some implementations, the machine-learned model can include a convolutional machine-learned model that includes one or more convolutional filters and modifying, by the one or more computing devices, the machine-learned model to include the model patch can include replacing, by the one or more computing devices, at least one of the convolutional filters with a depth-wise separable convolution.

In some implementations, the machine-learned model can include a plurality of layers and at least some the second set of learnable parameters included in the model patch can include parameters included in one or both of a squeeze function or an excite function for one or more layers of the plurality of layers.

In some implementations, the machine-learned model can include a plurality of layers and at least some the second set of learnable parameters included in the model patch can include parameters included in a gating function for one or more layers of the plurality of layers.

In some implementations, the machine-learned model can include a plurality of layers and the model patch can include at least one additional intermediate layer that is structurally positioned between at least two of the plurality of layers.

In some implementations the method can further include, simultaneous with training, by the one or more computing devices, the machine-learned model including the model patch on the second training dataset to perform the second task: training, by the one or more computing devices, the machine-learned model excluding the model patch on the first training dataset to perform the first task.

In some implementations, training, by the one or more computing devices, the machine-learned model excluding the model patch on the first training dataset to perform the first task can include training, by the one or more computing devices, the machine-learned model excluding the model patch but including an alternative model patch on the first training dataset to perform the first task.

In some implementations, the first task can include processing of first input data structured according to a first domain and the second task can include processing of second input data structured according to a second domain that is different than the first domain.

In some implementations, the method can further include, after training, by the one or more computing devices, the machine-learned model on the second training dataset to perform the second task: receiving, by the one or more computing devices, new input data; and when the new input data is structured according to the first domain, employing, by the one or more computing devices, the machine-learned model excluding the model patch to process the new input data to generate a first prediction; and when the new input data is structured according to the second domain, employing, by the one or more computing devices, the machine-learned model including the model patch to process the new input data to generate a second prediction.

In some implementations, the new input data can be structured according to the first domain, the second domain can include a smaller number of dimensions than the first domain, and the method further can include: determining, by the one or more computing devices, a resource-allocation parameter that corresponds to a desired amount of resources allocated to processing of the new input data; and determining, by the one or more computing devices, whether to convert the new input data from the first domain to the second domain based at least in part on the resource-allocation parameter. In some implementations, when the new input data is converted to the second domain, the method includes said employing, by the one or more computing devices, the machine-learned model including the model patch to process the new input data to generate the second prediction.

In some implementations, the first domain can include a first image resolution, the first task can include processing imagery of the first input resolution, the second domain can include a second image resolution that is smaller than the first image resolution, and the second task can include processing imagery of the second input resolution.

In some implementations, the machine-learned model can include a neural network and the model patch can include a patch subnetwork.

In some implementations, training, by the one or more computing devices, the machine-learned model on the second training dataset to perform the second task can include: determining, by the one or more computing devices, a training allocation parameter that corresponds to a desired amount of resources to allocate to training the machine-learned model on the second training dataset to perform the second task; and learning the new values for the second set of learnable parameters while keeping a subset of first set of learnable parameters fixed, where a ratio of the subset of first set of learnable parameters to all of the first set of learnable parameters is determined based at least in part on and is correlated with the training allocation parameter.

In some implementations, the first task can include object detection and the second task can include image classification.

Another example aspect of the present disclosure is directed to a computer-implemented method. The method can include obtaining, by a worker device, a machine-learned model that includes a first set of learnable parameters. The method can include modifying, by the worker device, the machine-learned model to include a model patch. The model patch can include a second set of learnable parameters. The method can include, after modifying the machine-learned model to include the model patch, training, by the worker device, the machine-learned model on a local dataset that is stored locally at the worker device. Training, by the one or more computing devices, the machine-learned model on the local training dataset can include learning new values for both the first set of learnable parameters and the second set of learnable parameters. The method can include transmitting, by the worker device to a central system, data descriptive of the new values for only the first set of learnable parameters but not the second set of learnable parameters.

Another example aspect of the present disclosure is directed to a computer-implemented method. The method can include obtaining, by one or more computing devices, a model that includes an existing set of learnable parameters. The method can include generating, by the one or more computing devices, a first model patch that includes a first set of learnable parameters and a second model patch that includes a second set of learnable parameters. The method can include simultaneously: training, by the one or more computing devices, the model including the first model patch but not the second model patch on a first set of training data to perform a first task; and training, by the one or more computing devices, the model including the second model patch but not the first model patch on a second set of training data to perform a second task that is different than the first task.

Another example aspect of the present disclosure is directed to a computer system. The computer system can include one or more processors; and one or more non-transitory computer-readable media that collectively store instructions that, when executed by the one or more processors, cause the computer system to perform any of the methods described herein.

Another example aspect of the present disclosure is directed to one or more non-transitory computer-readable media that collectively store instructions that, when executed by one or more processors, cause the one or more processors to perform any of the methods described herein.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
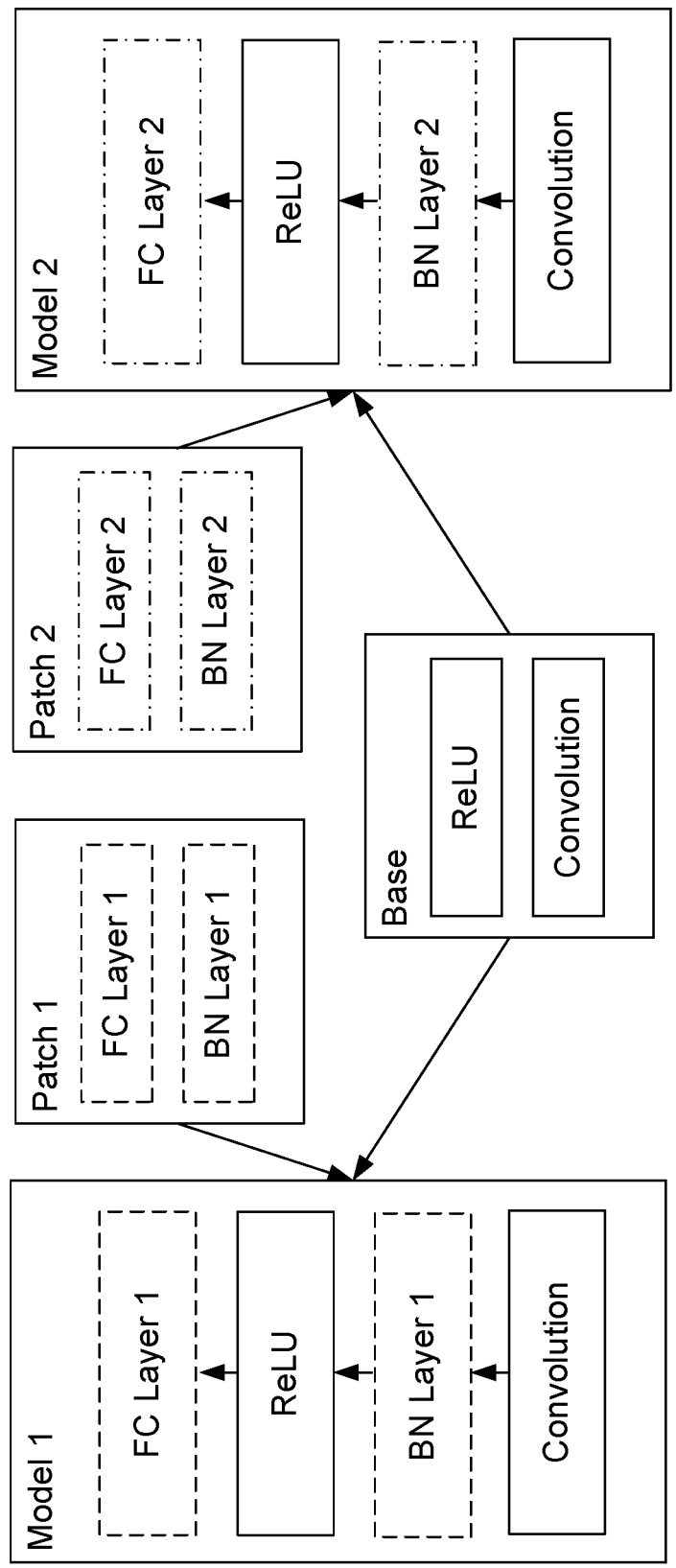
FIG. 1A depicts a graphical diagram of example model patches according to example embodiments of the present disclosure.

Reference numerals that are repeated across plural figures are intended to identify the same features in various implementations.

DETAILED DESCRIPTION

Overview

Example aspects of the present disclosure are directed to systems and methods that enable parameter-efficient transfer learning, multi-task learning, and/or other forms of model re-purposing such as model personalization or domain adaptation. In particular, as one example, a computing system can obtain a machine-learned model (e.g., neural network) that has been previously trained on a first training dataset to perform a first task. The machine-learned model can include a first set of learnable parameters (e.g., weights or other parameters). The computing system can modify the machine-learned model to include a model patch, where the model patch includes a second set of learnable parameters. After modifying the machine-learned model to include the model patch, the computing system can train the machine-learned model on a second training dataset to perform a second task that is different from the first task. Training the machine-learned model on the second training dataset can include learning new values for the second set of learnable parameters included in the model patch. In particular, according to an aspect of the present disclosure, in some implementations, training the machine-learned model on the second training dataset can include learning new values for the second set of learnable parameters while keeping at least some (e.g., all) of the first set of parameters fixed.

More particularly, one alternative technique for re-purposing pre-trained models is logit-based-tuning. In logit-based tuning, only the last layer (or sometimes last several layers) of the network are optimized to match the new task. However this technique requires learning a significant amount of new parameters and the resulting model performance is often subpar. In particular, fine-tuning the last layer is equivalent to training a linear classifier on top of existing features. This is typically done by running SGD while keeping the rest of the network fixed, however other methods such as SVM has been explored as well. It has also been repeatedly shown that this approach often works best for similar tasks.

An alternative approach is to use full fine-tuning where the pre-trained network is used simply as a starting point. It is then optimized as if trained from scratch, often using lower learning rate. While this often leads to a significantly improved accuracy when compared to the last-layer fine-tuning, the downside is that it requires one to create a full model for each new task.

In contrast to these approaches, the present disclosure provides systems and methods that enable a computing system to modify or otherwise update an existing machine-learned model (e.g., neural network) to solve a different task, while reusing most of its parameters and without significantly sacrificing accuracy compared to a model trained from scratch. In particular, a computing system can modify an existing model to include a small model patch that includes only a very small number of parameters when compared to the model as a whole (e.g., less than 1% in many cases). After modifying the model to include the model patch, the model can be re-trained by learning new values for the parameters of the model patch. In particular, in some implementations, the new values for the patch parameters can be learned while keeping the remainder of the model parameters fixed.

One concept guiding use of certain example patches as described herein is that the set of patch parameters should touch all channels and should be dispersed throughout the entire network (e.g., rather than being concentrated at the end of the network). In particular, in some implementations, at least a portion of the model patch is positioned structurally prior to a final output portion (e.g., a final layer) of the machine-learned model. For example, in some implementations, at least a portion of the model patch is included in an intermediate layer of the machine-learned model. This is in contrast to the logit-based fine-tuning described above, where only the last layer of the network is fine-tuned to match the new task. However, in some implementations, the model patch can also include the final layer of the machine-learned model.

More particularly, aspects of the present disclosure leverage the observation that individual layers often can be viewed as embedding spaces, rather than collection of largely independent features. With that perspective, even simple transformations of the space would result in significant change in the target classification. In some implementations, this significant change can be achieved by learning a model patch that acts on features at multiple layers of the network. For instance, example experiments described in U.S. Provisional Patent Application No. 62/737,763 show that by re-learning only a scale and bias patch (described further below) that accounts for less than 2% of model parameters, the accuracy of training the last layer alone could be surpassed. Moreover, by allowing both scales and biases to train along with the last layer, synergistic effects can be achieved which result in accuracies close to full model fine-tuning. This may be caused by more limiting space of functions.

More generally, the model patches can take a number of different forms. As one example, the model patch can be a scale and bias patch. For example, in some implementations, the machine-learned model can include a plurality of layers and at least some the learnable parameters included in the model patch can include one or both of scale and bias parameters for one or more layers of the plurality of layers. For example, the scale and bias parameters can normalize the inputs to or outputs of a layer by adjusting and scaling the activations. The patch can add scale and bias parameters to some or all of the layers of the model. The scale and bias parameters can operate according to various scale and bias schemes including, as examples, batch normalization, batch renormalization, layer normalization, or group normalization.

While certain alternative techniques include re-computing batch normalization statistics for different domains to help improve accuracy or for model quantization, the present disclosure significantly develops beyond these approaches and shows that learning of the bias and scale parameters actually provides a powerful tool for transfer and multi-task learning, especially when combined with linear classifier on the top of the network. Interestingly, while the learned bias and scale can be folded with batch-normalization statistics to create a model patch, some example experiments indicated that relying only on recomputed batch normalization statistics results in much worse performance.

Note that the approaches described herein are not inherently limited to bias and scale. For instance in a network that contains convolutions, doing fine-tuning on depth-wise layers, that have relatively few parameters, leads to similar, albeit smaller improvements.

More particularly, as another example type of model patch, the model patch can be a convolution patch. For example, in some implementations, the machine-learned model can be or include a convolutional machine-learned model that includes one or more convolutional filters. Modifying the machine-learned model to include the model patch can include replacing at least one of the convolutional filters with a reduced-parameter version of the convolutional filter. For example, the reduced-parameter version of the convolutional filter can be a depth-wise separable convolution. Some or all of the convolutional filters included in the model can be replaced with reduced-parameter versions.

As yet another example, the model patch can be a squeeze and excite patch. For example, in some implementations, the machine-learned model can include a plurality of layers and at least some the learnable parameters included in the model patch can include parameters included in one or both of a squeeze function or an excite function for one or more layers of the plurality of layers. The patch can add squeeze and excite parameters/functions to some or all of the layers of the model.

As another example, the model patch can be a gating function patch. For example, in some implementations, the machine-learned model can include a plurality of layers and at least some the learnable parameters included in the model patch can include parameters included in a gating function for one or more layers of the plurality of layers. The patch can add gating parameters/functions to some or all of the layers of the model.

As yet another example, the machine-learned model can include a plurality of layers and the model patch can include an additional layer that is added to the model. For example, the additional layer can be an additional intermediate layer that is structurally positioned between at least two of the plurality of layers of the model. Alternatively or additionally, single neurons and/or edges can be added to the network as part or all of the patch.

After modifying the model to include the model patch, the model can be re-trained by learning new values for the parameters of the model patch. In particular, in some implementations, the new values for the patch parameters can be learned while keeping the remainder of the model parameters fixed.

Thus, in some implementations, only the model patch parameters are permitted to change when performing transfer-learning. One result of this approach is that the number of parameters that are learned is much smaller as compared with logit-based tuning. In particular, the number of parameters in logit-based tuning often depends on the number of classes into which the input can be classified. For example, for the Inception V2 model, there are only about forty thousand parameters in biases/scales of the model, but four hundred thousand parameters for two hundred class classification problem.

Thus, aspects of the present disclosure enable re-training or re-purposing a machine-learned model to solve very different types of problems while reusing a significant portion (e.g., 95% or greater) of the existing parameter values. In particular, according to an aspect of the present disclosure, a small patch can be used to fine-tune a model in order for the model to be repurposed to a different task with minimal or no loss in accuracy compared to a model trained from scratch. Thus, the cost of learning a "new" model to perform a certain task can be drastically reduced (e.g., by 95% or greater). In addition, when compared to traditional logits-only fine-tuning, the systems and methods of the present disclosure lead to significant increases in accuracy, again while learning much fewer parameters. Thus, aspects of the present disclosure provide the technical effect and benefit of enabling high performing transfer learning with reduced resource expenditure. For example, fewer resources (e.g., processing power, processing time, memory space, bandwidth usage, energy usage, etc.) are required to be expended to perform transfer learning to re-purpose an existing model to learn to perform a new task.

In addition to sequential fine-tuning in which an already trained network is changed to solve a different problem, the present disclosure also provides techniques for simultaneous (e.g. multi-task) learning and other learning variants. As one example, a computing system can obtain a model that includes an existing set of learnable parameters and can generate a first model patch that includes a first set of learnable parameters and a second model patch that includes a second set of learnable parameters. The computing system can train the model including the first model patch but not the second model patch on a first set of training data to perform a first task while simultaneously training the model including the second model patch but not the first model patch on a second set of training data to perform a second task that is different than the first task. Thus, the existing set of parameters can be simultaneously learned from both the first and the second sets of training data. Interestingly, the multi-task learning approaches described herein can also act as a regularizer, often leading to improved performance when compared to models trained solely on a single task.

The systems and methods of the present disclosure have multiple applications and benefits, including training with limited training data, personalization of user models, resource-constrained training, enabling the development of a large number of diverse models specialized to different tasks and users, and also the introduction entirely new families of models.

In one example application, the systems and methods of the present disclosure can be used to dramatically increase the number of models available in resource-constrained settings, since the marginal cost of re-purposing a model is significantly less than training a full model from scratch. For example, since the number of parameters that are needed to re-purpose the model is significantly reduced, the systems and methods of the present disclosure can enable local on-device training of personalized models, while reducing the risk of over-fitting and reducing privacy concerns. The constrained fine-tuning also enables better generalization when limited amount data is available. Thus, on device transfer learning can be performed with reduced expenditure of resources (e.g., processing power, processing time, memory space, bandwidth usage, energy usage, etc.).

As another example application, the techniques of the present disclosure can be combined with a federated learning approach, where individual devices ship their gradient updates to the central server. In particular, in the proposed setting, each device may maintain its own personalized model by splitting the update and sending shared parameters to the main centralized model while keeping their own personalized patch stored on device.

As one example, a distributed worker device (e.g., an embedded device, edge device, user/consumer device, etc.) can obtain a machine-learned model that includes a first set of learnable parameters. The worker device can modify the machine-learned model to include a model patch, where the model patch includes a second set of learnable parameters. After modifying the machine-learned model to include the model patch, the worker device can train the machine-learned model on a local dataset that is stored locally at the worker device. For example, the local dataset can be personal training data stored on a user device. Training the machine-learned model on the local training dataset can include learning new values for both the first set of learnable parameters and at least some (e.g., all) of the second set of learnable parameters. The worker device can transmit, to a central system, data descriptive of the new values for only the first set of learnable parameters but not the second set of learnable parameters. In such fashion, the personalized patch parameters remain private while updates to the shared public parameters are communicated to a central server for aggregation with other updates from other updates to improve a global model.

As another example application, resource-intelligent inference can be performed. In particular, using the domain adaptation techniques described herein, multiple different models can be efficiently generated which handle different respective input domains of different respective dimensional sizes. After generation of the models, a computing system can determine a resource-allocation parameter that corresponds to a desired amount of resources allocated to processing of new input data (e.g., to generate an inference or prediction). The computing system can determine, based at least in part on the resource-allocation parameter, whether to convert the new input data from a first domain to a second domain that has a reduced-dimensionality related to the first domain. Once a domain is chosen for the new input data, the appropriate model can be employed to process the new input data. As one example, multiple models can be generated which process imagery of different input resolutions. If the current context of resource-availability dictates (e.g., low battery, large number of other applications open, etc.) an image to be processed can be downsampled to a smaller input resolution and a model that has been adapted to handle that smaller resolution can be used to process the image, thereby expending an optimal and desired amount of resources on inference given the current resource-availability context.

A similar concept can be applied to perform resource-intelligent training. For example, based on current context of resource-availability, a computing system can determine a training allocation parameter that corresponds to a desired amount of resources to allocate to training a machine-learned model. The computing system can learn new values for parameters of a model patch while keeping a subset of original parameters of the model fixed, wherein a ratio of the subset of original parameters to all of the original parameters is determined based at least in part on and is correlated with the training allocation parameter, thereby expending an optimal and desired amount of resources on inference given the current resource-availability context. Stated differently, more or fewer parameters can be fixed versus learnable to enable the device to strike a resource-appropriate balance of accuracy versus training cost.

The present disclosure provides a novel way of performing transfer learning where a patch is added to modify only a very small fraction of model parameters (e.g., adding less than 1% more parameters) while achieving a significant accuracy on very different tasks. This enables generation of a large number of models with very small incremental cost per model.

Example Systems and Methods

One central concept embodied in the systems and methods proposed herein is that of a model patch. A model patch can, in some formulations, be thought of or include a set of parameters (e.g., layers of parameters) that is added to a structure of a given model (e.g., a neural network). The size of a patch is typically (but is not required to be) a tiny fraction of the size of the model it is acting on.

As one example, suppose a deep network M is a sequence of layers represented by their parameters (weights), $W_1, \ldots, W_n$. This formulation ignores non-trainable layers (e.g., some kinds of activations). In this example, a model patch P is a set of parameters $W'_{i_1}, \ldots, W'_{i_k}$, that adds layers at positions $i_1, \ldots, i_n$. Thus, a patched model $$M' = \{W_1, \ldots, W_{i_1}, W'_{i_1}, \ldots, W_{i_n}, W'_{i_n}, \ldots, W_n\}$$

Several different kinds of patches are described herein. As shown below, in some instances, they can be folded with the other layers in the network, eliminating the need to perform any explicit addition of layers.

FIG. 1A provides an example illustration of model patches in which a base model can be modified with two different patches to produce two different models. The abbreviation FN is a fully connected layer. The abbreviation BN is a batch normalization layer.

Example Scale and Bias Patches

In some implementations, a purpose of a scale and bias patch is to transform some or every hidden state in the network using scaling and offsetting. Batch normalization (BN) is typically used in deep neural networks to mitigate the effect of the so-called covariant shift that occurs when using minibatches during training. We find that BN offers a convenient way to introduce the scale and bias patch in a network. Let X be an activation tensor. Then, the batch-normalized version of X $$BN(X) = \gamma \frac{X - \mu(X)}{\sigma(X)} + \beta$$

where $\mu(X)$, $\sigma(X)$ are mean and standard deviation statistics computed per minibatch, and $\gamma$, $\beta$ are learned via backpropagation. These statistics can be computed as mini-batch average, while during inference they can be computed using global averages. Following the proposed approach, one possible model patch in this case corresponds to all the $\gamma$, $\beta$ in the network. Using BN as the model patch also satisfies the criterion that the patch size should be small. For instance, the BN parameters in a MobilenetV2 network performing classification on Imagenet amount to less than 2% of the model's total number of parameters.

In example experiments (see U.S. Provisional Patent Application No. 62/737,763), it was found that when $\mu$, $\sigma$ are also allowed to adapt to the new dataset in transfer learning, the results are much better. Note that, although batch normalization in described above, other normalization techniques such as batch renormalization, layer normalization, and/or group normalization can also be used to make scale and bias model patches.

Example Convolutional Patches

In some instances, a purpose of a convolutional patch is to substitute existing spatial convolution filters in a network with reduced-parameter filters. As one example, depth-wise separable convolutions can be substituted for existing spatial convolution filters in a network to form a convolutional patch.

In depth-wise separable convolutions, a standard convolution is decomposed into two layers: a depthwise convolution layer, that applies one convolutional filter per input channel, and point-wise layer that computes the final convolutional features by linearly combining the depthwise convolutional layers' output across channels. The set of depthwise convolution layers can be repurposed as the model patch. The key reason is that it is lightweight (accounts for less than 3% of MobilenetV2 for instance). The depth-wise separable convolutions can optionally also include linear bottlenecks and/or expansions.

Example Channel-Gating Patches

In addition or alternatively to use of static bias and scale where we learn static $\gamma_i x_i + \beta_i$ parameters, bias and scale can be introduced that can be used to build a gating function that further improves the transfer-learning accuracy. More specifically, suppose X is the output of a convolutional layer.

A gating function can be defined for channel i as follows: $g_i(X) = \sigma(a_i * \overline{X}_i + b_i)$, where $\overline{X}_i$ is spatially pooled i-th channel and $a_i$ and $b_i$ are learned parameters. It can be used to scale the final activation:

$Y_i = g(x_i) * X_i$

This approach is related to the Squeeze-and-Excitation approach of Hu et al. (Squeeze-and-Excitation Networks, 2017). However, instead of using low-rank approximation, scaled input can simply be used to generate the excited outputs. The result is that it requires much fewer extra parameters, while providing extra expressivity.

Example Transfer Learning and Domain Adaptation

In one example domain adaptation technique, pretrained models can be fine-tuned by allowing only the model patch parameters to be learned. As one example, only the batch normalization parameters $\beta$, $\gamma$ are allowed to be trained, while the rest of the parameters (e.g., weights) are kept fixed in the model (e.g., network). The procedure can be similar for transfer learning, with the difference that: in transfer learning, the last layer for the new task is likely to be different as the space of possible outputs of the network is likely to be different from the task that it was originally trained on.

Example Multi-Task Learning

In multi-task learning, a computing system simultaneously, but independently, trains multiple neural networks that share most of the weights (and implicitly, the architecture). Unlike in transfer learning, where a large fraction of the parameters are kept frozen, in at least some multi-task implementations, all of the parameters of the model are learned. In some implementations, only the parameters belonging to the model patch are private to each task and all other parameters are shared. This kind of learning configuration offers more adaptability to the tasks at hand without compromising on the total number of parameters that are involved.

Figure 1B:
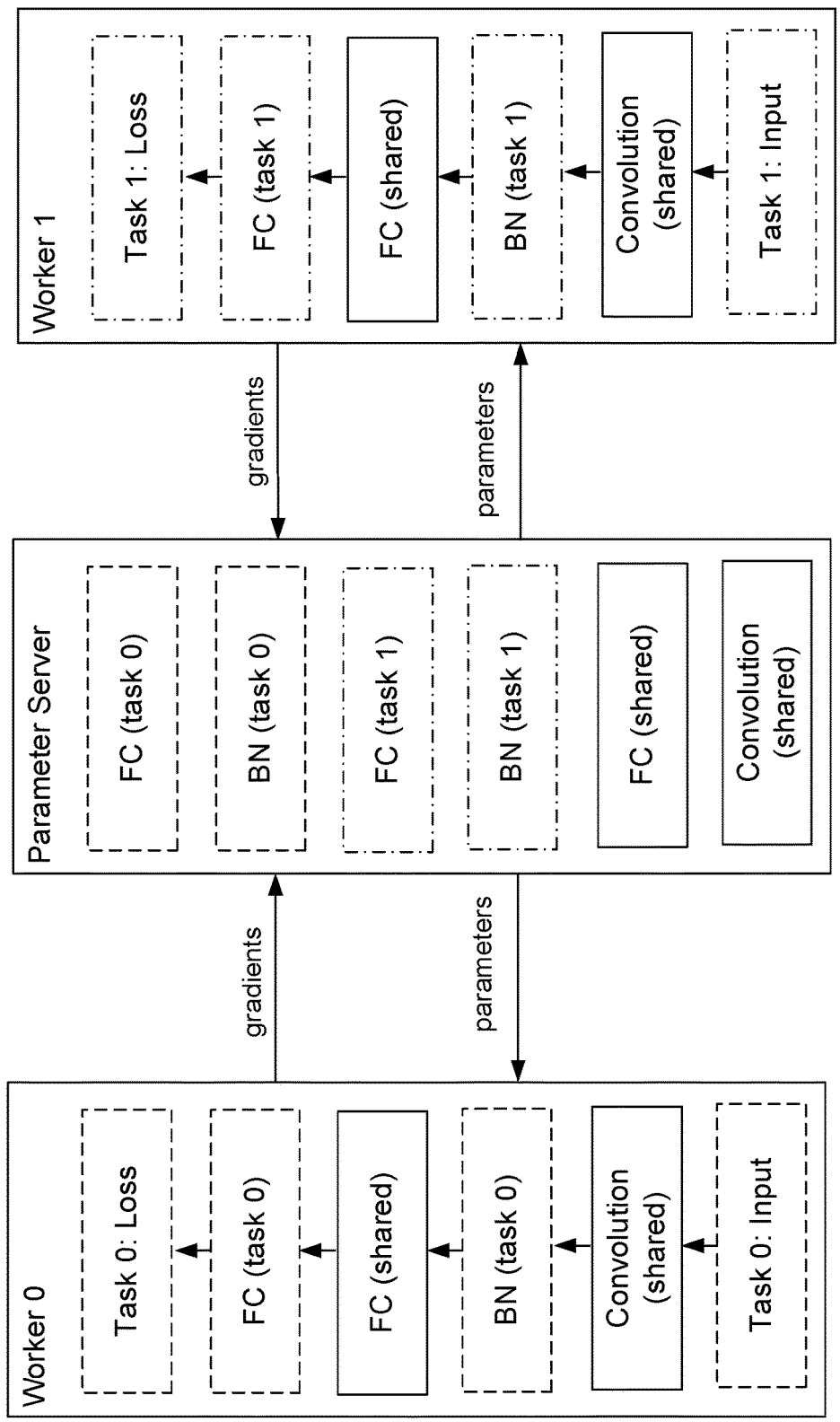
FIG. 1B depicts a graphical diagram of an example multi-task learning process according to example embodiments of the present disclosure.

In some implementations, to perform multi-task learning, a distributed Tensorflow paradigm can be used: a central parameter server receives gradient updates from each of the workers and updates the weights. Each worker reads the input, computes the loss and sends gradients to the parameter server. Subsets of workers are allowed to train different tasks; workers thus may have different computational graphs, and task-specific input pipelines and loss functions. The training can be done asynchronously. A visual depiction of this setting is shown in FIG. 1B.

In order to inhibit one task from dominating the learning of the weights, it can be ensured that the learning rates for different tasks are comparable at any given point in time.

Example Experiments

U.S. Provisional Patent Application No. 62/737,763 contains data from example experiments conducted on aspects of the present disclosure. Some of the example experiments described in U.S. Provisional Patent Application No. 62/737,763 demonstrate that using biases and scales alone allows existing neural networks to solve very different problems. Furthermore, the example experiments show that learning linear decision boundary (e.g., as opposed to using a random one) provides a significant accuracy boost to the learned network, though the network is still capable to adapting to random linear classifier. The entirety of U.S. Provisional Patent Application No. 62/737,763 is incorporated into and forms a portion of this specification.

Example Transfer Learning Experiments

Example experiments demonstrated that the proposed approach leads to significant improvement over logit-based fine-tuning, on multiple datasets and network architectures, while requiring much fewer parameters. For instance, a network trained on ImageNet, can be fine-tuned to a very high accuracy on CIFAR-10/100, often exceeding logit based fine-tuning leads to low accuracy. Example implementations of the proposed approach allow for either random logit layer or can be combined with logit layer to get accuracies close to full-fine-tuning.

Example Multi-task Learning Techniques

Example experiments demonstrated that models can be trained on multiple tasks simultaneously where the workers for each task send independent gradient updates to both shared and task-specific parameters using standard optimization algorithms. It was shown that simultaneously training two such overlapping networks on Imagenet and Places-365 can reach accuracies comparable to individually trained models. In such a setting, accuracy was observed to be comparable or higher than from either transfer learning or independent per-task training. This may be because all the weights are being adapted to both tasks, while also benefiting from regularization effects of bigger datasets, while still allowing models to specialize.

Example Domain Adaptation Techniques

Example experiments also showed that the proposed approach can also enable multi-task learning to create a model that would solve the same classification problem for different domains. For example for Imagenet, it was shown that the proposed approach can train MobilenetV2 to operate on 5 resolution scales (224, 192, 160, 128 and 96), while sharing all the weights except for biases and scale and still achieving the same accuracy as models that were trained on each resolution independently. This enables power-constrained operation, where an application can switch to a lower resolution to save on latency/power, without needing to ship separate models and having to make that trade-off decision at the application design time. Thus, a single model can be shipped to the device and then multiple different variants can be made (e.g., using different patches) and trained at the device to provide multiple models for different (but potentially related) tasks.

Additional Example Experiments

Additional example experiments also demonstrated that using the cascade combining algorithm of (Streeter, Approximation algorithms for cascading prediction models. In ICML, 2018) can reduce the average running time by about 15% without sacrificing any accuracy while adding tiny number of extra parameters.

Finally, certain experimental results demonstrated that a feature extractor for SSD for 18-class COCO object detection model can be transferred to 1001-class ImageNet classifier and still give reasonably high accuracy. This suggests that there is a lot of potential of sharing model weights even between different types of problems.

Example Devices

Figure 2A:
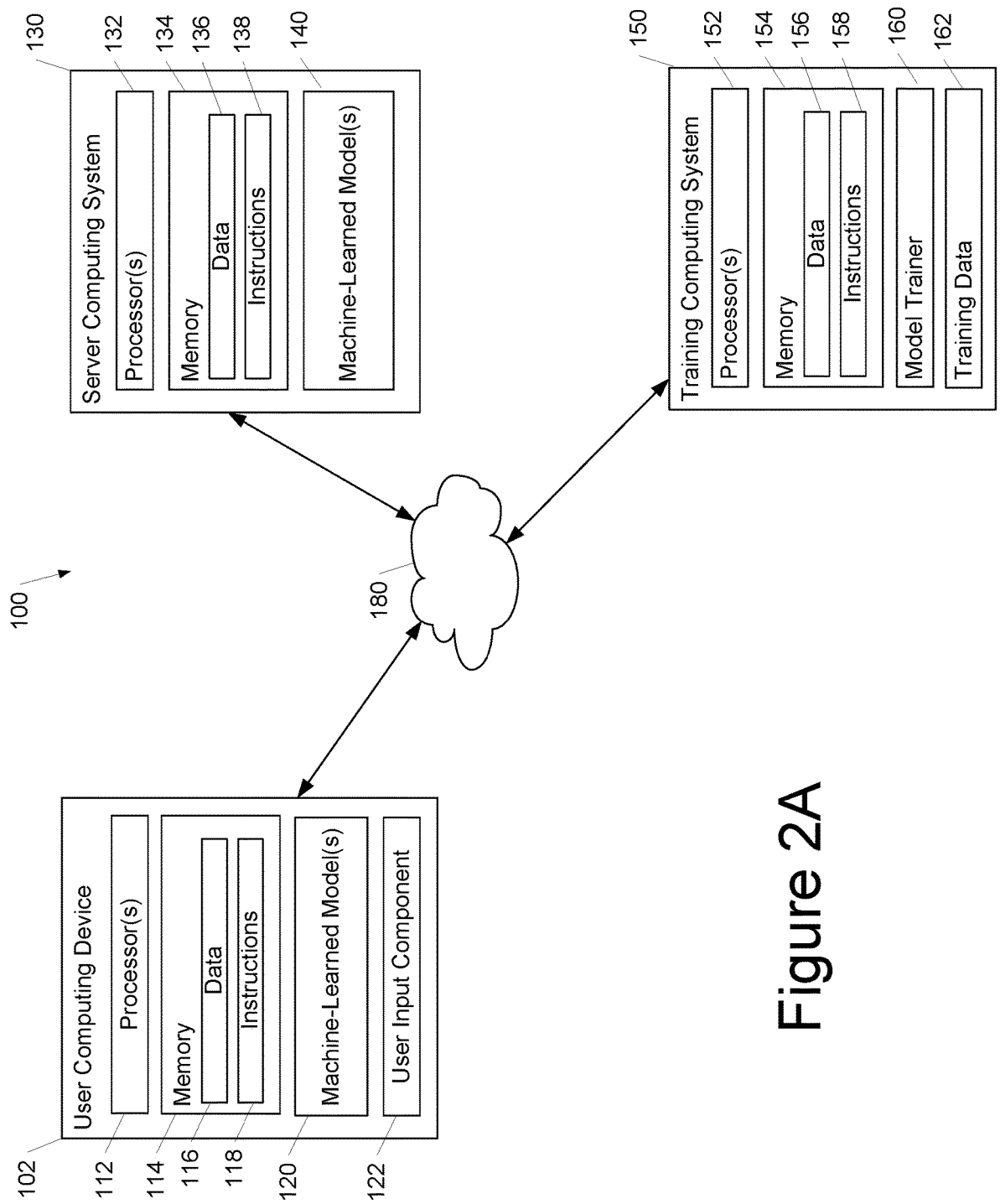
FIG. 2A depicts a block diagram of an example computing system according to example embodiments of the present disclosure.

FIG. 2A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, an edge computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, multiple different sets of training data that are respectively useful to train the models to perform multiple different tasks. As examples, the training data can include sets of training data that are useful to train a model to perform object detection, object recognition, object segmentation, image classification, and/or other tasks.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media. In some implementations, the model trainer 160 can be replicated and/or distributed across a number of different devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
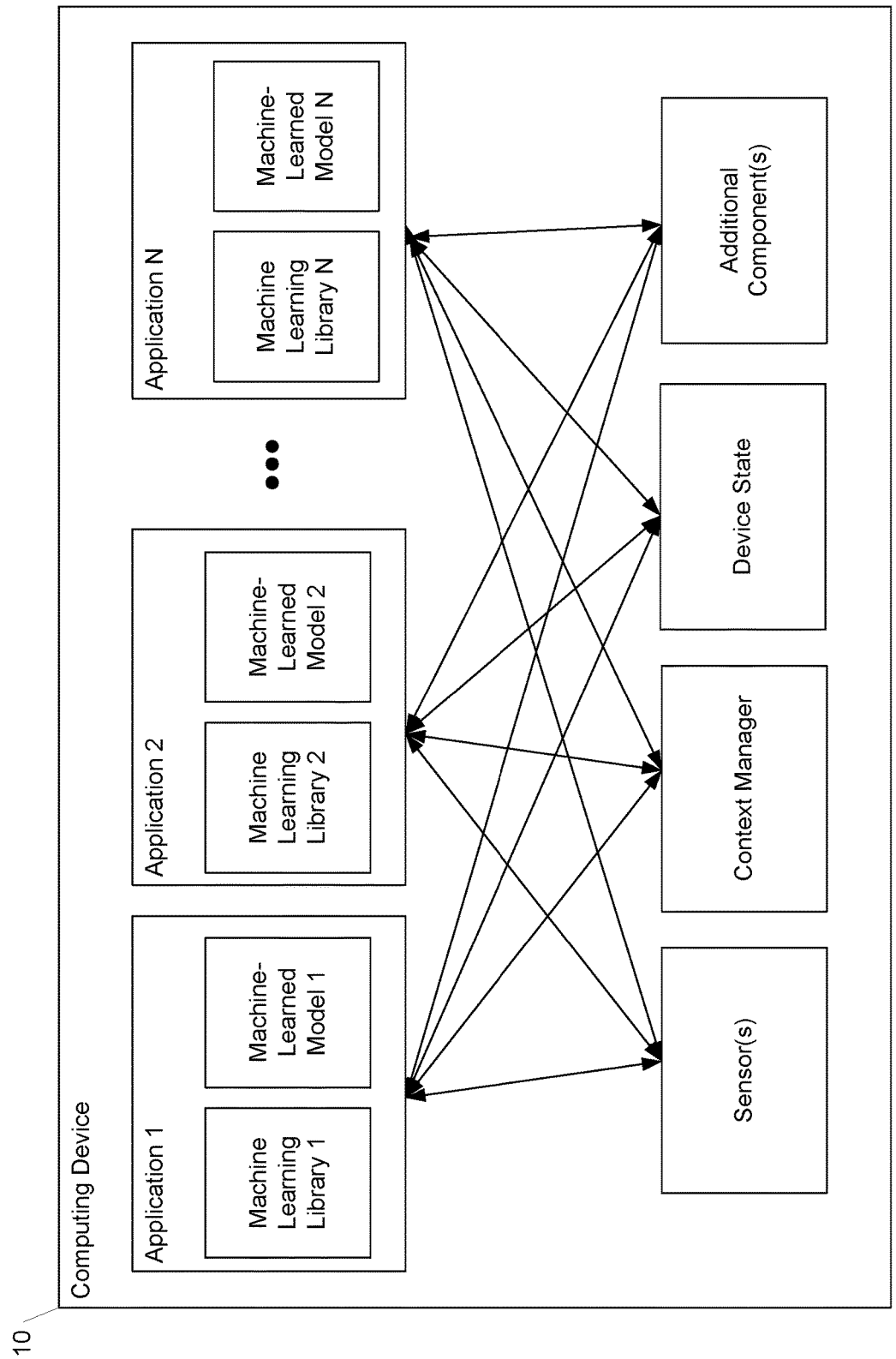
FIG. 2B depicts a block diagram of an example computing device according to example embodiments of the present disclosure.

FIG. 2B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
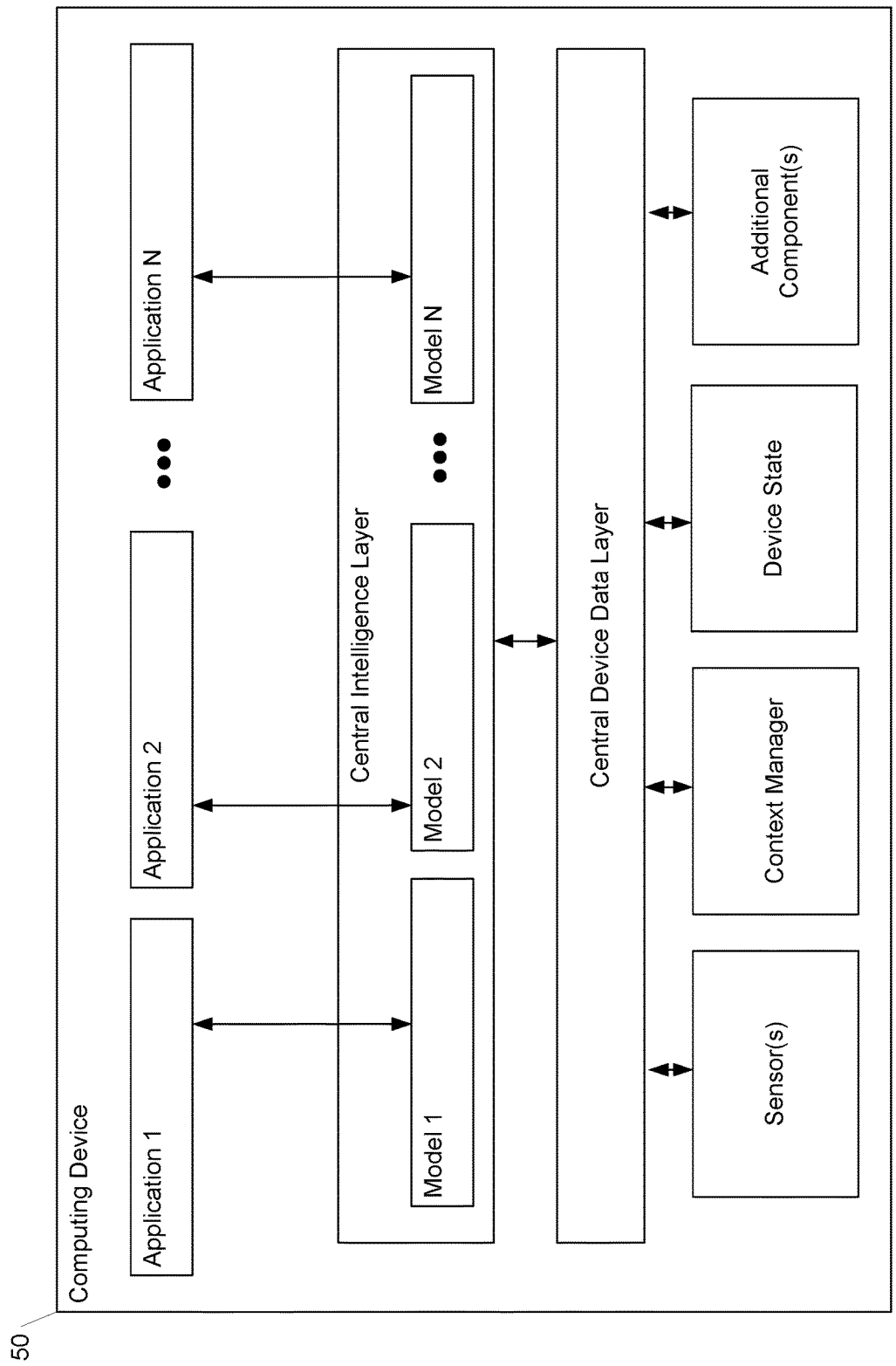
FIG. 2C depicts a block diagram of an example computing device according to example embodiments of the present disclosure.

FIG. 2C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

The invention claimed is:

1. A computer-implemented method, the method comprising:
obtaining, by one or more computing devices, a machine-learned model that has been previously trained on a first training dataset to perform a first task, the machine-learned model including a first set of learnable parameters;
modifying, by the one or more computing devices, the machine-learned model to include a model patch, the model patch including a second set of learnable parameters, wherein the machine-learned model comprises a plurality of layers, and at least some the second set of learnable parameters included in the model patch comprise one or both of scale and bias parameters for one or more layers of the plurality of layers; and
after modifying the machine-learned model to include the model patch, training, by the one or more computing devices, the machine-learned model on a second training dataset to perform a second task that is different from the first task, wherein training, by the one or more computing devices, the machine-learned model on the second training dataset to perform the second task comprises learning new values for the second set of learnable parameters included in the model patch.

2. The computer-implemented method of claim 1, wherein training, by the one or more computing devices, the machine-learned model on the second training dataset to perform the second task comprises learning the new values for the second set of learnable parameters while keeping at least some the first set of learnable parameters fixed.

3. The computer-implemented method of claim 1, wherein training, by the one or more computing devices, the machine-learned model on the second training dataset to perform the second task comprises learning the new values for the second set of learnable parameters while keeping at least a majority of the first set of learnable parameters fixed.

4. The computer-implemented method of claim 1, wherein training, by the one or more computing devices, the machine-learned model on the second training dataset to perform the second task comprises learning the new values for the second set of learnable parameters while keeping all of the first set of learnable parameters fixed.

5. The computer-implemented method of claim 1, wherein, after modification of the machine-learned model to include the model patch, at least a portion of the model patch is positioned structurally prior to a final layer of the machine-learned model.

6. The computer-implemented method of claim 1, wherein, after modification of the machine-learned model to include the model patch, at least a portion of the model patch is included in an intermediate layer of the machine-learned model.

7. The computer-implemented method of claim 5, wherein the model patch further includes the final layer of the machine-learned model.

8. The computer-implemented method of claim 1, wherein the scale and bias parameters for the one or more layers comprise scale and bias parameters for one or more batch normalization operations performed respectively for the one or more layers.

9. The computer-implemented method of claim 1, wherein the scale and bias parameters for the one or more layers comprise scale and bias parameters for one or more layer normalization operations, one or more batch renormalization operations, or one or more group normalization operations performed respectively for the one or more layers.

10. The computer-implemented method of claim 1, wherein:
the machine-learned model comprises a convolutional machine-learned model that includes one or more convolutional filters; and
modifying, by the one or more computing devices, the machine-learned model to include the model patch comprises replacing, by the one or more computing devices, at least one of the convolutional filters with a reduced-parameter version of the convolutional filter.

11. The computer-implemented method of claim 1, wherein:
the machine-learned model comprises a convolutional machine-learned model that includes one or more convolutional filters; and
modifying, by the one or more computing devices, the machine-learned model to include the model patch comprises replacing, by the one or more computing devices, at least one of the convolutional filters with a depth-wise separable convolution.

12. The computer-implemented method of claim 1, wherein:
at least some the second set of learnable parameters included in the model patch comprise parameters included in one or both of a squeeze function or an excite function for one or more layers of the plurality of layers.

13. The computer-implemented method of claim 1, wherein:
at least some the second set of learnable parameters included in the model patch comprise parameters included in a gating function for one or more layers of the plurality of layers.

14. The computer-implemented method of claim 1, wherein:
the model patch comprises at least one additional intermediate layer that is structurally positioned between at least two of the plurality of layers.

15. The computer-implemented method of claim 1 further comprising, simultaneous with training, by the one or more computing devices, the machine-learned model including the model patch on the second training dataset to perform the second task:
training, by the one or more computing devices, the machine-learned model excluding the model patch on the first training dataset to perform the first task.

16. The computer-implemented method of claim 15, wherein training, by the one or more computing devices, the machine-learned model excluding the model patch on the first training dataset to perform the first task comprises training, by the one or more computing devices, the machine-learned model excluding the model patch but including an alternative model patch on the first training dataset to perform the first task.

17. The computer-implemented method of claim 1, wherein the first task comprises processing of first input data structured according to a first domain and the second task comprises processing of second input data structured according to a second domain that is different than the first domain.

18. The computer-implemented method of claim 17, further comprising, after training, by the one or more computing devices, the machine-learned model on the second training dataset to perform the second task:
receiving, by the one or more computing devices, new input data; and
when the new input data is structured according to the first domain, employing, by the one or more computing devices, the machine-learned model excluding the model patch to process the new input data to generate a first prediction; and
when the new input data is structured according to the second domain, employing, by the one or more computing devices, the machine-learned model including the model patch to process the new input data to generate a second prediction.

19. The computer-implemented method of claim 18, wherein the new input data is structured according to the first domain, wherein the second domain comprises a smaller number of dimensions than the first domain, and wherein the method further comprises:
determining, by the one or more computing devices, a resource-allocation parameter that corresponds to a desired amount of resources allocated to processing of the new input data; and
determining, by the one or more computing devices, whether to convert the new input data from the first domain to the second domain based at least in part on the resource-allocation parameter;
wherein, when the new input data is converted to the second domain, the method includes said employing, by the one or more computing devices, the machine-learned model including the model patch to process the new input data to generate the second prediction.

20. The computer-implemented method of claim 17, wherein the first domain comprises a first image resolution, the first task comprises processing imagery of the first input resolution, the second domain comprises a second image resolution that is smaller than the first image resolution, and the second task comprises processing imagery of the second input resolution.

21. The computer-implemented method of claim 1, wherein the machine-learned model comprises a neural network and the model patch comprises a patch subnetwork.

22. The computer-implemented method of claim 1, wherein training, by the one or more computing devices, the machine-learned model on the second training dataset to perform the second task comprises:
determining, by the one or more computing devices, a training allocation parameter that corresponds to a desired amount of resources to allocate to training the machine-learned model on the second training dataset to perform the second task;
and learning the new values for the second set of learnable parameters while keeping a subset of first set of learnable parameters fixed, wherein a ratio of the subset of first set of learnable parameters to all of the first set of learnable parameters is determined based at least in part on and is correlated with the training allocation parameter.

23. The computer-implemented method of claim 1, wherein the first task comprises object detection and the second task comprises image classification.

24. A computer-implemented method, the method comprising:
obtaining, by a worker device, a machine-learned model that includes a first set of learnable parameters;
modifying, by the worker device, the machine-learned model to include a model patch, the model patch including a second set of learnable parameters, wherein the machine-learned model comprises a plurality of layers, and at least some of the second set of learnable parameters included in the model patch comprise one or both of scale and bias parameters for one or more layers of the plurality of layers;
after modifying the machine-learned model to include the model patch, training, by the worker device, the machine-learned model on a local dataset that is stored locally at the worker device, and wherein training, by the one or more computing devices, the machine-learned model on the local training dataset comprises learning new values for both the first set of learnable parameters and the second set of learnable parameters; and
transmitting, by the worker device to a central system, data descriptive of the new values for only the first set of learnable parameters but not the second set of learnable parameters.

25. A computer-implemented method, the method comprising:
obtaining, by one or more computing devices, a model that includes an existing set of learnable parameters;

generating, by the one or more computing devices, a first model patch that includes a first set of learnable parameters and a second model patch that includes a second set of learnable parameters, wherein the machine-learned model comprises a plurality of layers, and at least some of the second set of learnable parameters included in the model patch comprise one or both of scale and bias parameters for one or more layers of the plurality of layers;

simultaneously:

training, by the one or more computing devices, the model including the first model patch but not the second model patch on a first set of training data to perform a first task; and training, by the one or more computing devices, the model including the second model patch but not the first model patch on a second set of training data to perform a second task that is different than the first task.

26. A computer-implemented method, the method comprising:

obtaining, by one or more computing devices, a machine-learned model that has been previously trained on a first training dataset to perform a first task, the machine-learned model including a first set of learnable parameters;

modifying, by the one or more computing devices, the machine-learned model to include a model patch, the model patch including a second set of learnable parameters; and after modifying the machine-learned model to include the model patch, training, by the one or more computing devices, the machine-learned model on a second training dataset to perform a second task that is different from the first task, wherein training, by the one or more computing devices, the machine-learned model on the second training dataset to perform the second task comprises:

learning new values for the second set of learnable parameters included in the model patch;

determining, by the one or more computing devices, a training allocation parameter that corresponds to a desired amount of resources to allocate to training the machine-learned model on the second training dataset to perform the second task; and learning the new values for the second set of learnable parameters while keeping a subset of first set of learnable parameters fixed, wherein a ratio of the subset of first set of learnable parameters to all of the first set of learnable parameters is determined based at least in part on and is correlated with the training allocation parameter.

* * * * *